United States Patent [19]

Holman, Jr. et al.

[11] Patent Number: 5,070,450

[45] Date of Patent: Dec. 3, 1991

[54] POWER ON COORDINATION SYSTEM AND METHOD FOR MULTIPLE PROCESSORS

[75] Inventors: Thomas H. Holman, Jr.; David R. Lunsford, both of Austin, Tex.

[73] Assignee: Dell USA Corporation, Austin, Tex.

[21] Appl. No.: 532,045

[22] Filed: May 25, 1990

[51] Int. Cl.⁵ .............................................. G06F 11/00
[52] U.S. Cl. ................................ 395/750; 364/229.2; 364/240.4; 364/273; 364/269; 364/270.7; 364/271.2; 364/948.4; 364/DIG. 1; 364/DIG. 2
[58] Field of Search ... 364/200 MS File, 900 MS File; 371/9.1, 12, 14

[56] References Cited

U.S. PATENT DOCUMENTS

| | | | |
|---|---|---|---|
| 4,162,526 | 7/1979 | Gass et al. | 364/200 |
| 4,204,249 | 5/1980 | Dye et al. | 364/200 |
| 4,,312,035 | 1/1982 | Greene | 364/200 |
| 4,351,025 | 9/1982 | Hall, Jr. | 364/200 |
| 4,354,229 | 10/1982 | Davis et al. | 364/200 |
| 4,368,514 | 1/1983 | Persaud et al. | 364/200 |
| 4,428,044 | 1/1984 | Liron | 364/200 |
| 4,428,048 | 1/1984 | Berlin, Jr. | 364/200 |
| 4,521,847 | 6/1985 | Ziehm et al. | 371/12 |
| 4,593,349 | 6/1986 | Chase et al. | 364/200 |
| 4,593,349 | 6/1986 | Chase et al. | 364/200 |
| 4,593,350 | 6/1986 | Mitchell et al. | 364/200 |
| 4,757,442 | 7/1988 | Sarata | 371/12 |
| 4,803,682 | 2/1989 | Hara et al. | 371/12 |
| 4,882,669 | 11/1989 | Miura et al. | 371/9.1 |
| 4,916,704 | 4/1990 | Bruckert et al. | 371/9.1 |

Primary Examiner—Michael R. Fleming
Assistant Examiner—Robert S. Hauser
Attorney, Agent, or Firm—Thomas G. Devine

[57] ABSTRACT

A computer system includes a first processor, a second processor, a bus shared by the first processor and the second processor, and a power on reset coordination means for the first processor and the second processor. The power on reset coordination means includes means for resetting the first processor and the second processor, and means for deasserting reset to the first processor and second processor sequentially. It should be noted that in embodiments of the present invention, some "other" processor must be "up" in order to reset the "first" processor or to deassert reset to it.

12 Claims, 6 Drawing Sheets

| RESET | BIT N | IMPROC # | RESET N |
|---|---|---|---|
| 1 | X | X | 1 |
| 0 | 1 | 0 | 1 |
| 0 | 1 | 1 | 0 |

POWER ON COORDINATION SYSTEM AND METHOD FOR MULTIPLE PROCESSORS

CROSS REFERENCE TO RELATED APPLICATIONS

This application is related to the following U.S. patent applications:

| SER. NO. | TITLE | INVENTOR | FILING DATE |
|---|---|---|---|
| 490,003 | Method and Apparatus Performing Multi-Master Bus Pipelining | Zeller, et al. | 03/07/90 |
| | Processor and Cache Controller Interface Lock Jumper (DC-00118) | Holman, et al. | |
| | Multiple DRAM Assemblies Using a Single PCB (DC-00120) | Holman | |
| | Dual Path Memory Retrieval System for an Interleaved Dynamic RAM Memory Unit (DC-00129) | Gaskins, et al. | |
| 516,628 | Digital Computer Having An Error Correction Code (ECC) System With Comparator Integrated Into Re-encoder | Longwell, et al | 04/30/90 |
| 516,894 | Minimized 32-Bit Error Correction Bad Bit Decoder | Longwell, et al | 04/30/90 |
| 516,606 | Shared Logic for Error Correction System Encoding | Longwell, et al. | 04/30/90 |

All of the foregoing applications are assigned to the assignee of the present invention and are herby incorporated by reference.

BACKGROUND OF THE INVENTION

1. Field of the Invention

The present invention relates to apparatus for controlling electrical power and, more particularly, to apparatus for controlling electrical power in computer systems and the like.

2. Description of Related Art

Contemporary computer systems frequenty include multiple processors for enhanced speed of operation. Often, for reasons of efficiency and/or economy, such multiple processor computer systems have shared resources, such as memory and I/O subsystems. To ensure that such computer systems work properly, they have been provided with means for ensuring that conflicting accesses to the shared resources are avoided to prevent misreads, errors and the like.

A variety of means have heretofore been developed for preventing conflicting accesses to shared resources in multiple processor systems. One such means which in incorporable into multiple processor systems sharing a bus, has been bus arbitration. Such bus arbitration means have been programmed to prevent conflicting accesses by multiple processors of various shared resources. Another means for accomplishing the same results in system configurations which involve multiple processors and the non-bused resources includes using complex software driven mechanisms. Of course, the use of dedicated resources, wherein each processor can prevent other network processors from accessing their resources, has also been employed in various prior art systems, but such configurations are not able to obtain the benefits of using shared resources, as discussed above.

A critical time for the prevention of conflicting accesses between multiple processors which are sharing resources is during power on reset. If individual processors in such multiple processor systems are not brought up in an orderly fashion, conflicting accesses to shared resources may occur. The need to avoid conflicting accesses is especially pronounced, and especially difficult to deal with, in systems that are reconfigurable to allow either multiple processors or dedicated memory. Final system design is typically not established until late in the manufacturing process of such systems and such design can vary significantly from system, requiring great flexibility and the ability to deal with various different configurations. In any event, in operation of all such systems, it is generally desirable to hold off the coming on line of the secondary processors until the primary processor configuration is established. Then it is desirable for the secondary processors to be brought up in an orderly fashion.

Although it would seem that the deficiencies and shortcomings of the proir art relating to powering up of a multiple processor system would have heretofore generated teachings in U.S. Patents, that does not seem to have been the case although a number of U.S. Patents have delth with the orderly powering up of peripheral units. For example, U.S. Pat. No. 4,593,349 to chase et al. discloses a peripheral power control sequencer incorporating a microcomputer to control the sequencing of the powering of a plurality of peripheral control units. The Chase et al. patent teaches time-sharing the terminals of the input/output ports of the microcomputer to accommodate the several input and output signals needed to accomplish the sequential powering of the peripheral control units. Another prior art patent dealing with peripheral units is U.S. Pat. No. 4,312,035 to Greene. The Greene patent discloses an apparatus for controlling electrical power in a data processing system having one or more central processing units and a plurality of peripheral units, including circuitry for selectively connecting a voltage signal to each peripheral unit to cause power to be supplied thereto. The apparatus taught in the Greene patent also includes metering means for measuring the amount of time the voltage signal is provided to each separate peripheral whereby the supply of power to any one of the peripheral units may be centrally monitored and controlled. Yet other U.S. patents in this general area are U.S. Pat. No. 4,809,163 to Hirosawa et al., U.S. Pat. No. 4,794,525 to Pickert et al. and U.S. Pat. No. 4,677,566 to Whittaker et al.

Based upon the foregoing, it is clear that the prior art has not been able, without being subject to stringent software dependant constraints, to allow multiple processors in a system to share resources and still maintain an orderly coordinated power on reset. Futhermore, the prior art has not produced a power on reset means which satisfies the needs of multiple processor/shared resources with respect to coordinated power on activities while still allowing great flexibility in the design of multiprocessor systems.

SUMMARY OF THE INVENTION

The present invention overcomes the shortcomings and deficiencies of the prior art discussed above by providing a computer system which includes a first processor, a second processor, a bus shared by the first processor and the second processor, and a power on reset coordination means for the first processor and the second processor. According to the teachings of the present invention, the power on reset coordination means includes means for resetting the first processor and the second processor, and means for deasserting reset to the first processor and to the second processor sequentially.

In embodiments of the computer system according to the present invention, deassertion of reset to a processor causes processor initialization, and the means for deasserting reset to the first processor and to the second processor sequentially deasserts reset to the second processor after initialization of the first processor. According to the teachings of the present invention, the means for resetting the first processor and the second processor may include a power on reset generator. Furthermore, the means for deasserting reset to the first processor and to the second processor sequentially may include the power on reset generator, which power on reset generator is operable to deassert reset, and means for delaying deassertion of reset to the second processor.

In aspects of the computer system of the present invention, means for delaying deassertion of reset to the second processor may include a power on register and an OR gate connected in circuit between the power on reset generator and the second processor. The power on reset register may include a plurality of bits, all of which bits are set high upon assertion of reset by the power on reset generator. The level of one of the plurality of bits can provide one input to the OR gate and the assertion or deassertion of reset can provide the other input to the OR gate.

In aspects of the present invention, the means for deasserting reset to the first processor and to the second processor sequentially may also include means for clearing a bit in the power on reset generator upon initialization of the first processor, the clearing of which bit allows the coming out of reset of the second processor. Embodiments of the present invention may also include at least one additional processor with associated power on register and OR gate as with the second processor, the at least one additional processor brought out of reset upon clearing of a bit in the power on register by the second processor.

According to the teachings of the present invention, a method of powering up multiple processors in a computer system includes the steps of asserting reset of each of the multiple processors, and deasserting reset of the multiple processors sequentially. Futher, according to the teachings of the present invention, deassertion of reset of a processor causes processor initialization, and the step of deasserting reset of the multiple processors sequentially proceeds to a succesive processor after initialization of each processor in the overall computer system.

In embodiments of the method according to the present invention, the steps of deasserting reset of the multiple processors may involve the step of delaying deassertion of reset to successive processors. In addition, the step of delaying deassertion of reset to successive processors may involve a power on register and OR gate connected in circuit between the means for deasserting reset and a processor to which deassertion of reset is to be delayed. The step of deasserting reset of the multiple processors may include the step of transmitting a signal from a newly initialized processor to the power on register, which signal clears a bit in the power on register. The cleared bit may change an input to an OR gate, thereby causing deassertion of reset to a successive processor.

Accordingly, it is an object of the present invention to provide a versatile means for coordinating power on reset in a multiple processor computer system.

Another object of the present invention is to increase architectural flexibility of computer systems by allowing ordered bring up of multiple processors.

BRIEF DESCRIPTION OF THE DRAWINGS

For a more complete understanding of the present invention and for futher objects and advantages thereof, reference may now be had to the following description taken in conjunction with the accompanying drawings in which.

DETAILED DESCRIPTION OF THE INVENTION

Figure 1A:
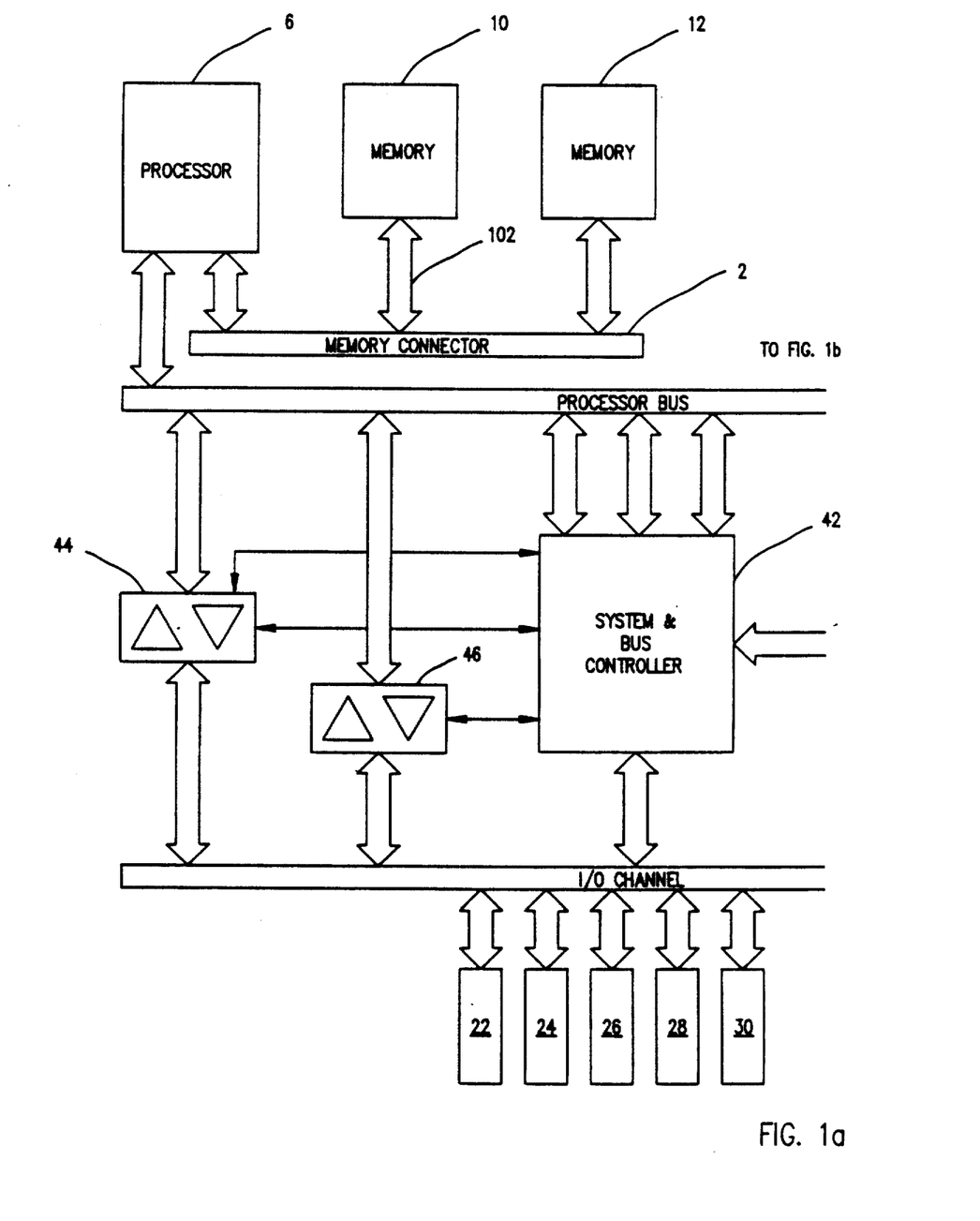
FIGS. 1a and 1b are a top level block digram of a computer system.
Figure 1B:
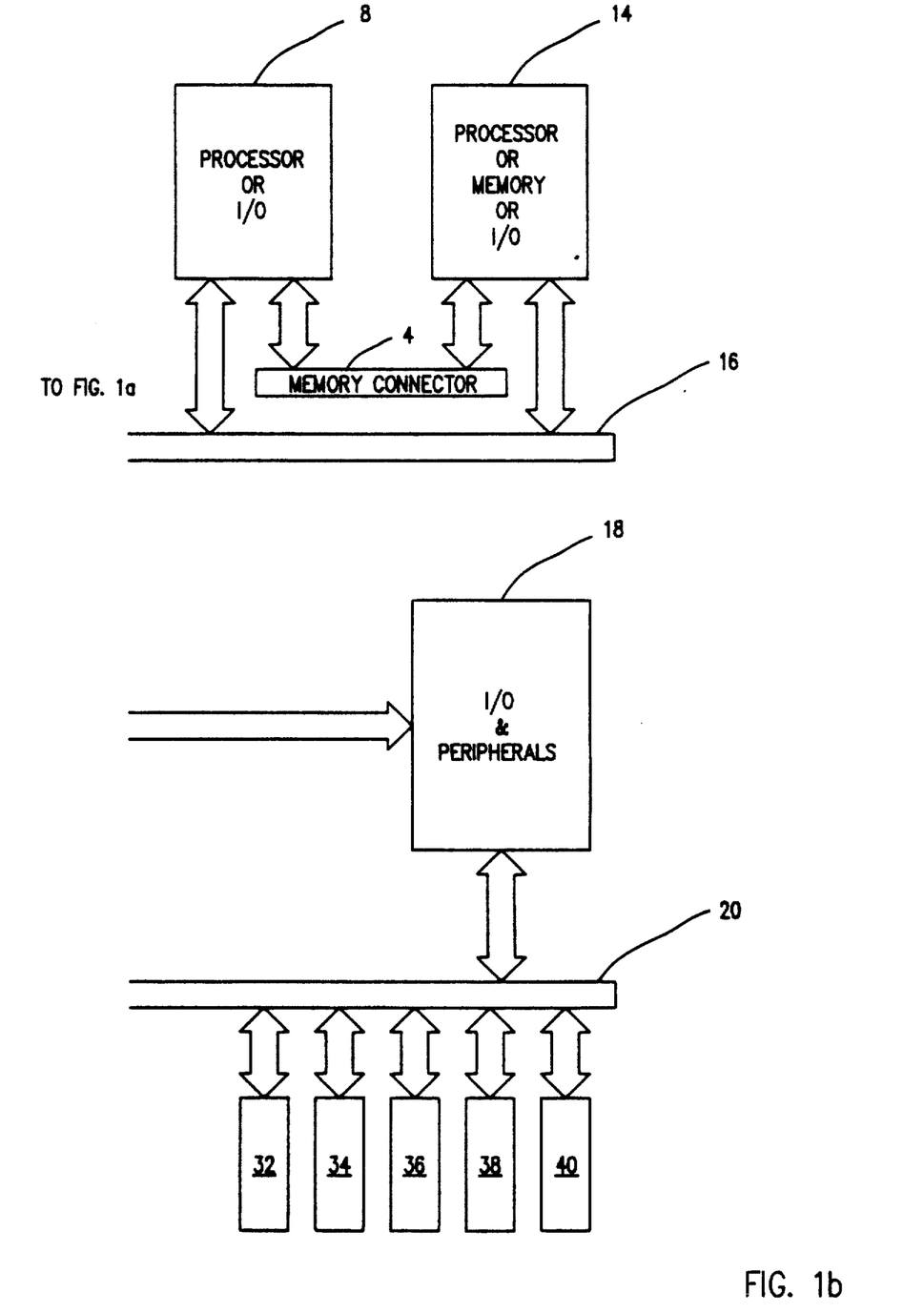

Referring now to the drawings wherein like reference numerals designate identical or similar elements throughout the several views, depicted in FIG. 1 is a general high level block diagram of a computer system. The present invention will herein initially be considered at this level, and at a number of successive, more detailed levels, to ensure full understanding and appreciation of the role and operation of the present invention in an environment in which it could be usefully employed.

FIG. 1 of a personal computer system employing the system of the present invention shows four main busses which represent the major interfaces at the top level. These buses are a first memory connector 2 and a second memory connector 4 (which are private interfaces between processors 6, 8 and their dedicated memories 10, 12 and 14, respectively), a processor bus 16 (a multiple master bus which is the architectural break between the processing units e.g., elements 6, 8, and I/O 18, and perhaps also 14), and an I/O channel 20 (e.g., a standard interface which may be ISA, EISA or microchannel).

The processor bus performs various functions. First, it serves as a connection between the processors 6, and 8, and intelligent I/O or processor 14; all system memory 10, 12 and memory 14; and the system I/O 18 and I/O expansion slots 22, 24, 26, 28, 30, 32, 34, 36, 38, 40. System memory 10, 12 and 14 may each be configured as a virtual 64 bit interleaved memory with two associated blanks for storage of one 32 bit double word each, one odd and one even. Thus, the processor bus 16 allows each processor 6, 8 to access another processor's 8, 6 memory. This access is allowed "through" that is directly connected to the memory. That is, when a processor connected to the processor bus 16 requests access to a location in some other processor's memory, the other processor completes the access locally, receiving the address from the processor bus 16 and transferring the data from and to the processor bus 16. Additionally, the processor bus 16 serves as a communication link between processors 6, 8 and 14. Through interprocessor communication mechanisms (the details of which are not critical to the present invention and, for that reason, are not set forth herein), each processor can address and interrupt each other processor.

In addition to the foregoing, the processor bus 16 also acts as the interface between the processor memory complexes and the I/O 18. Addresses and data are translated through a system and bus controller 42 between the processor bus 16 and the I/O channel 20 through a set of transceivers 44, 46 (such as Model 74AS245 transceivers made by Texas Instruments Incorporated). Through this interface, the processor bus master can access the system I/O and peripherals 18 as well as the I/O expansion slots 22, 24, 26, 28, 30, 32, 34, 36, 38, 40. Still further, the processor bus 16 acts as the data path for I/O to I/O accesses. The system and bus controller 42 generates "action codes" which format the protocol necessary for inter-device communication and enable intelligent cards plugged into an I/O expansion slot to access other I/O cards or the processor bus memory.

System and bus controller 42, in addition to providing routing information and action generation, handles all processor bus 16 arbitration and interface all control signals to the system I/O 18 (such as ISA "commands", DMA controls signals, and interrupts). The system and bus controller 42 is a custom-made chip in this preferred embodiment, but its details are not critical to the present invention and therefore will not be described herein.

Figure 2:
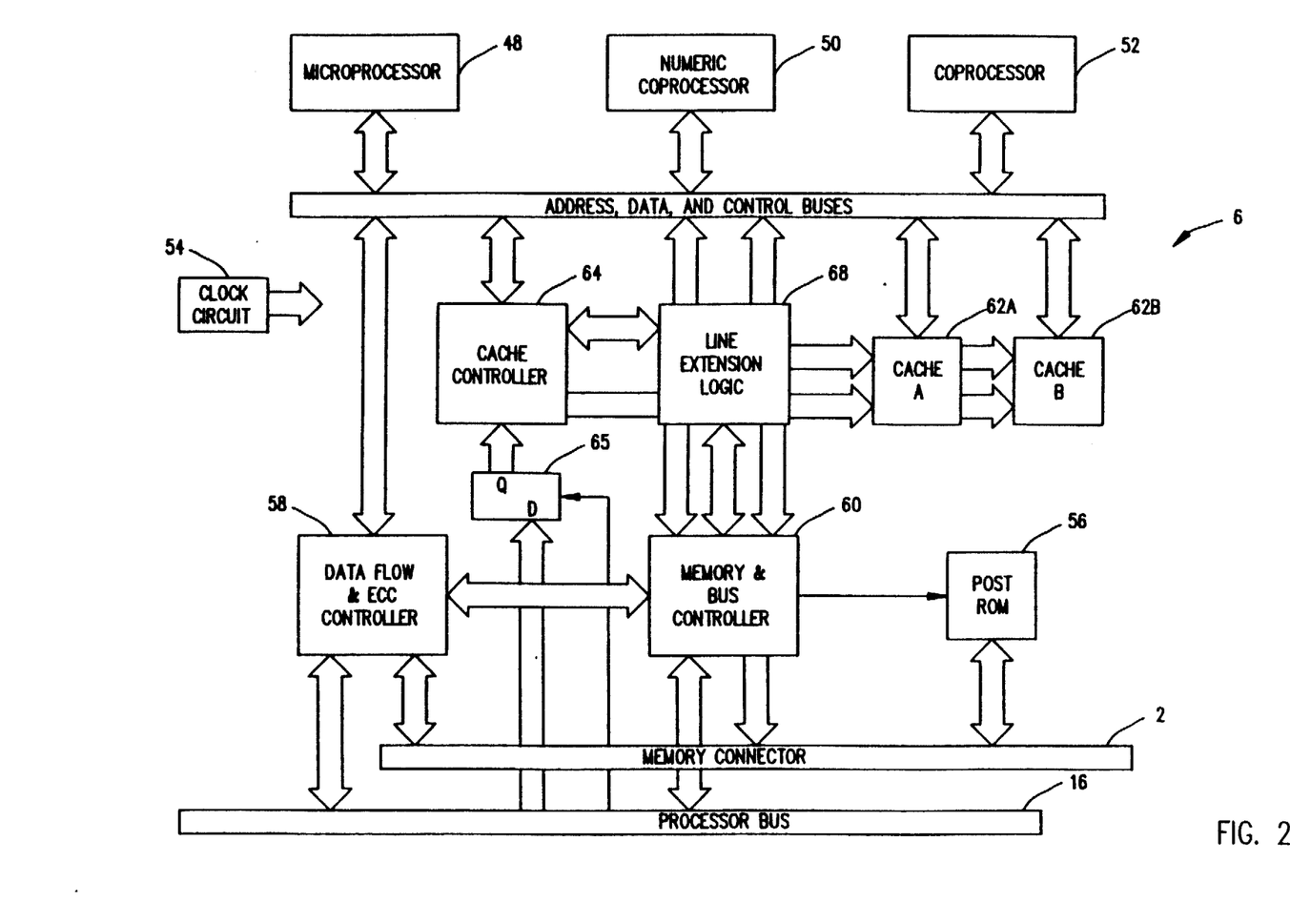
FIG. 2 is a block diagram of a processor module employed in the computer system of FIG. 1.

Referring now to FIG. 2, there is shown a block diagram of the major components of processor 6. With reference to FIG. 1, this processor module 6 can be seen to interface with the rest of the computer system through memory connector 2 and processor bus 16.

Processor module 6 includes a microprocessor 48 (e.g., an Intel 80386), a numeric coprocessor 50 (e.g., an Intel 80387), an optional coprocessor 52 (e.g., a Weitek 3167), a cache subsystem (discussed below), a clock circuit 54, a POWER ON SELF-TEST READ-ONLY MEMORY (POST ROM) 46, a data flow and ECC controller 58, and a memory and bus controller 60. The details of controllers 58 and 60 are not critical to this invention and therefore will not be described herein.

The cache subsystem includes a cache memory (shown as consisting of two separate blanks 62A, 62B of SRAMs and a cache controller 64 (e.g., an Intel 82385). As should be understood by those skilled in the art, the cache subsystem functions as an extremely fast, "sketch-pad-like" memory which provides rapid access to the data most frequently needed by the processor. As discussed in certain of the related applications identified above, a computer system may employ cache memory with cache line sizes of 4 double words each so that if a cacheable read is made by the processor, the memory controller returns 4 sequential double words into the cache from system memory.

For systems with a cache 62A, 62B, a snoop address latch 65 is included to capture each processor address that is generated in order to invalidate addresses if necessary. Additionally, in systems with a cache memory, a programmable array logic (PAL) line extension logic is included to control address and control signals passing between the cache 62A, 62B, cache controller 64, and memory and bus controller 60.

The processor module 6 also includes local address, data and control buses (indicated by the various arrows shown in FIG. 2) that intrerconnect the microprocessor 48, coprocessors 50, 52 and cache 62A, 62B, as well as the data flow and ECC controller 58 and memory and bus controller 60. These buses are used for local cycles such as ROM 56 reads, coprocessor cycles and cache read hits. Access to the ROM 56 can be accomplished via operation of the data flow and ECC controller 58. For global cycles such as cache writes, cache read misses, non-cacheable cycles, and I/O cycles, however, the processor module 6 must complete its access off-board.

For off-board cycles, the memory and bus controller 60 decodes the local address and control signals and determines whether the access is destined for the processor bus 16 or for the dedicated memory. For a memory cycle, the memory and bus controller 60 generates the memory control signals (i.e., RAS, CAS and WE) and addresses to access the memory. The memory and bus controller 60 also generates refresh signals to the memory, e.g., element 10, for each refresh period. In conjunction with the memory bus controller 60, the data flow and ECC controller 58 also performs error checking and correction.

For off-board cycles that are not destined for the memory 10 (FIG. 1), the memory and bus controller 60 generates a processor bus request signal and takes control of the processor bus 16 when it is granted. Again, working in conjunction with the data flow and ECC controller 58, the memory and bus controller 60 completes the access to the processor bus 16. As previously discussed, the memory bus controller 60 and data flow and ECC controller 58 are custom-made VLSI components.

Figure 3:
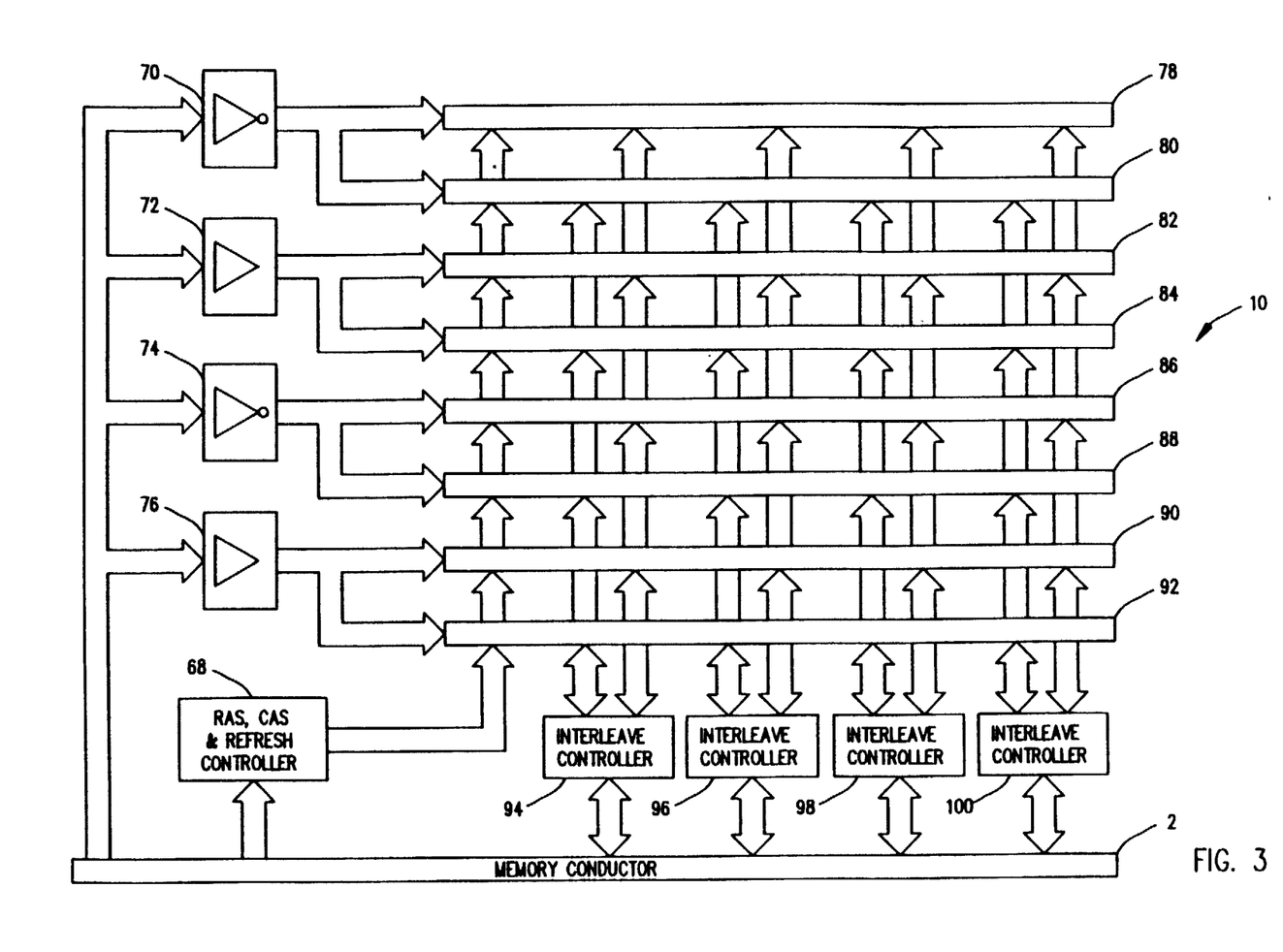
FIG. 3 is a block diagram of a memory module employed in the computer system of FIG. 1.

Referring now to FIG. 3, a block diagram of the major components of memory 10 is set forth therein. With reference to FIG. 1, memory 10 interfaces to the rest of the system through the memory conductor 2.

As discussed above, memory 10 preferably implements storage of virtual 64 bit words in the form of 2 interleaved banks of 32 bit double words, one odd and one even. Each memory 10 includes a RAS, CAS, and refresh controller 68, four address buffers 70, 72, 74, 76, eight single in-line memory (SIMM) slots 78, 80, 82, 84, 86, 88, 90, 92, and four interleave controllers 94, 96, 98, 100. The RAS, CAS, and refresh controller 68 receives control signals from the memory interface 102 (See FIG. 1), which is driven by the memory and bus controller 60 (see FIG. 2), and then, in turn, drives the control signals to the SIMM slots 68, 80, 82, 84, 86, 88, 90, 92 for reads, writes and refreshes. Each of the four interleave controllers 94, 96, 98, 100 multiplexes eight bits of data between the memory connector 2 and the SIMM slots 78, 80, 82, 84, 86, 88, 90, 92.

As discussed in greater detail in certain of the related applications, the data may be split between even and odd banks of 32 bits of data in order to accomplish true interleaving. That is, for each read, 64-bits of data can be accessed, and the four interleave controllers 94, 96, 98, 100 select 32-bits (either even or odd data) for the current access. A subsequent access can be completed in a single processor clock cycle because the second 32-bit double word is already accessed and latched. Like the memory and bus controller 60, the RAS, CAS, and refresh controller 68 and the four interleave controllers are custom-made VLSI chips.

As previously mentioned, memory 10 includes address buffers 70, 72, 74, 76 and SIMM slots 78, 80, 82, 84, 86, 88, 90, 92. By way of example only, Model 74FCT828 and 74FCT827 data buffers manufactured by VTC could be used as the address buffers 70, 72, 74, 76. Inverting (74FCT828's) and non-inverting (74FCT827's) buffers are used to minimize the average address line signal switching to minimize electrical noise. The SIMM slots 78, 80, 82, 84, 86, 88, 90, 92 could be adapted to accommodate either 1, 2, 4 or 8 Mbyte SIMMs with parity or ECC organization.

Figure 4:
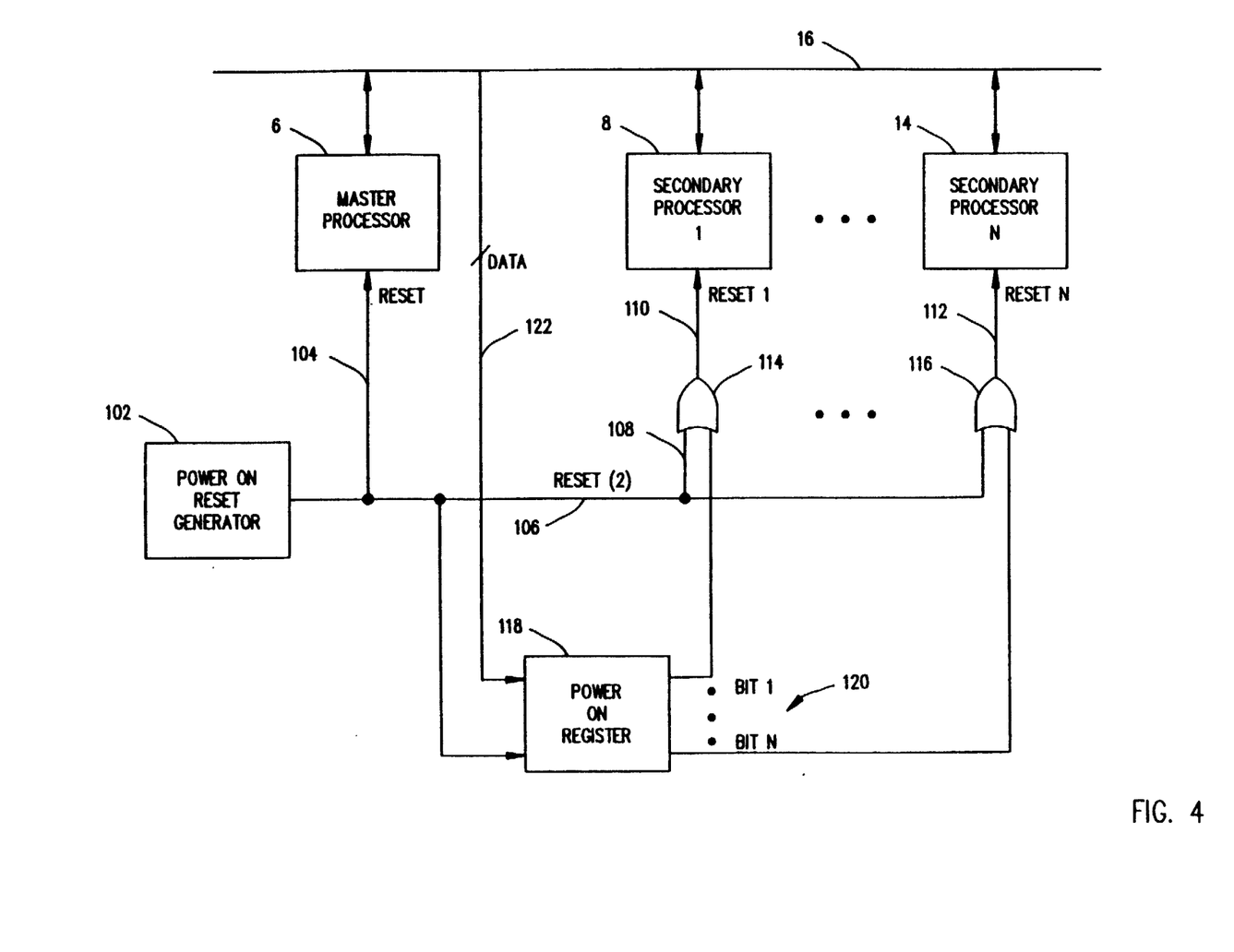
FIG. 4 is a block diagram of a coordinated power on circuit cnfiguration according to the teachings of the present invention.

Referring now to FIG. 4, a block diagram of a coordinated power on circuit configuration according to the teachings of the present invention is shown therein. With respect to the depicted circuit configuration's relation to the computer system of FIG. 1, it should be appreciated also that each processor 6, 8, 14 is constructed per the discussion above relating to FIG. 2 (and also, of course, per the illustration itself of FIG. 2). Memories, as shown in FIG. 3, would be connected to the various processors 6, 8, 14 and shown and discussed above with regard to FIG. 1.

The power on reset coordination circuit of the present invention may be seen in FIG. 4 to include a power on reset generator 102. This power on reset generator 102 includes any of a number of well-known conventional circuit or other means for asserting RESET to each processor 6, 8, 14 when the overall system is powered on, and then which circuit or means also operates to deassert RESET to each processor after completion of a suitable reset cycle. In this preferred embodiment, a VSLI Technology, Incorporated type 82C300 is employed. Referring to FIG. 4, assertion and deassertion of RESET can be transmitted directly to processor 6 via line 104. Those same signals can be transmitted to processors 8 and 14 via lines 106/108/110 and 106/112, respectively, although it may be seen in FIG. 4 that such transmission is not direct, but rather through OR gates 114 and 116, as is explained in greater detail below.

The power on reset coordination circuit of the present invention also includes a power on register 118. As such a power on register is conventional and well known to those skilled in the art, it should be appreciated that power on register 118 includes a plurality of bits 1—N, generally designated in FIG. 4 by reference numeral 120. These bits 1—N are designed to correspond to the number of processors. It should be understood and appreciated, therefore, that whereas only three processors 6, 8, 14 are shown in FIG. 4, any number of secondary processors from 1 to N may be employed in embodiments of the present invention, and each of those processors will have an associated bit in the power on register 118.

As mentioned above, the power on reset coordination circuit of the present invention also employs OR gates 114, 116. It should be appreciated that there is one OR gate for each secondary processor 1—N, and that one input to each OR gate is the RESET or deasserted RESET signal, and the other input to each OR gate is the value assigned to the bit of bits 1—N corresponding to the processor 1—N with which the OR gate is associated. Thus, in FIG. 4, processor 8 may be considered to be processor 1, bit 1 is one input to OR gate 114 (1) associated with that processor, and the RESET or deasserted RESET signal is the other input to OR gate 114 (1). Likewise, processor 14 may be considered to be a processor N, bit N is one input to OR gate 116 (N) associated with that processor, and so on. As is well-known to those skilled in the art, OR gates 114, 116 perform the logic operation that for signals on line 110, 112 to be false or low, both inputs (i.e., inputs from both the power on reset generator and power on register) must be low. Of course, within the framework described above, a low signal from generator 102 is a deasserted RESET and a low signal from register 118 is a zeroed bit 1—N.

It is important to realize that power on reset generator 102 brings all bits 1—N high during RESET. Thus, during operation, when the overall system is powered up, and master processor 106 is initialized by the RESET/deasserted RESET cycle, all bits 1—N are brought high and remain high to block initializing of the secondary processors because the power on register's input to the OR gates 114, 116 is high. This remains the case, even after the deassertion signal goes low because the bit inputs remain high. Stated another way, recognizing that RESET and deasserted RESET receipt by a processor is needed to effect bringing up or initialization of that processor, the circuit according to the present invention blocks such bringing up in all cases in which a bit 1—N, associated with a processor 1—N, remains high.

An aspect of the present invention is that a processor, once brought up, can cause a bit to go low, e.g., by signals sent over the bus and line 122 from any processor to register 118. The various processors can be programmed to effect such a bit lowering by coventional programming means. Thus, it is possible within the framework described above for a processor to control bringing up of processors to be subsequently brought up, thereby ensuring conflicting accesses are not made by the various processor to shared resources (e.g., bus 16). The bringing up process described above can be controlled, of course, by conventional time out procedures or through equally conventional interprocessor communications techniques, well-known to those skilled in the art.

Referring back to FIG. 1, it should be appreciated that the circuit shown in FIG. 4 can be incorporated into such a system to prevent processors such as processors 8 and 14 from contending during power on initialization. Since element 14 may be either a processor or a dedicated memory (such as shown in FIG. 3), the memory data and memory control lines (indicated by element 4) are connected between the slots into which elements 8 and 14 are inserted. Since this memory interface is dedicated, the processors 8, 14 come out of reset driving these data and control lines 4. The present invention allows, e.g., a processor 14 to come up first while keeping a processor 8 in the reset state. After processor 14 completes its initialization, it clears a bit in register 118 (see FIG. 4). Then, processor 8 is allowed to come out of reset. It should be appreciated that the logic described with respect to FIG. 4 could be the reverse thereof.

Yet another aspect of the present invention involves use of an IMPROC ("I am a processor") signal. Such a signal could be employed to inform the reset logic whether or not to generate the reset. Such a reset would not be necessary, for example, if a memory card was placed in a slot that could accept either a processor or a memory card. Such a signal would be useful though to inform the logic that a processor is installed and that, therefore, initialization control should be effected.

Figure 5:
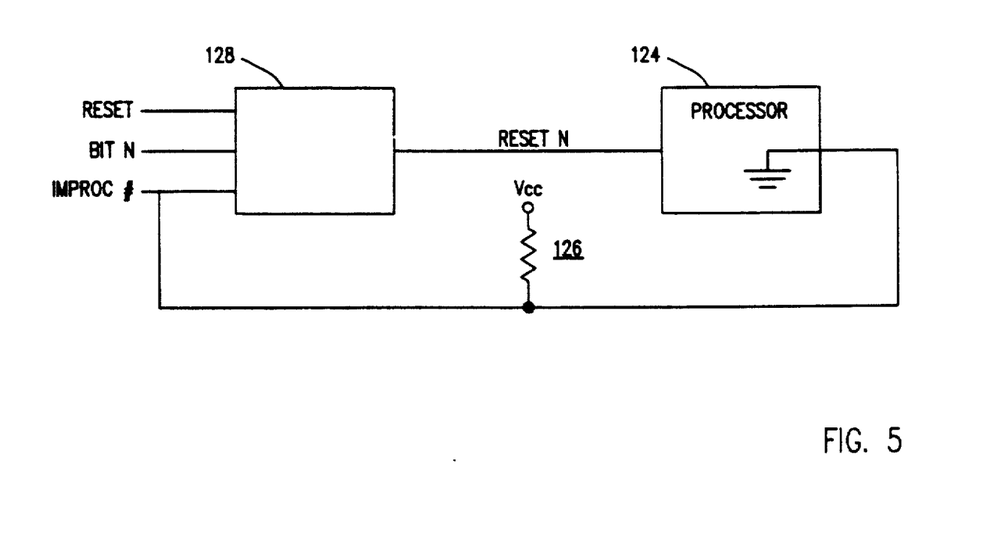
FIG. 5 is a block diagram of a portion of the circuit configuration of FIG. 4.
Figure 6:
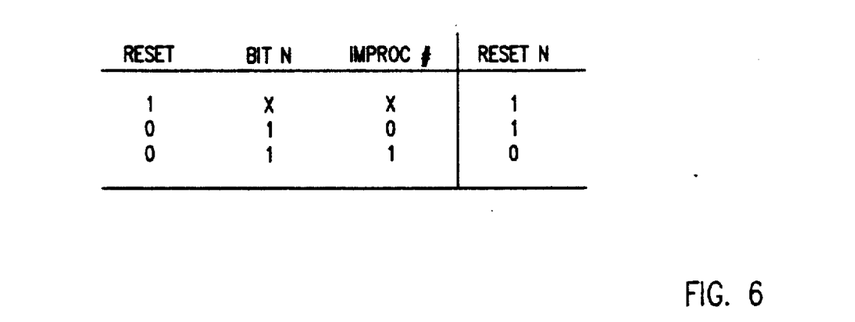
FIG. 6 is a table depicting Reset N values connection with RESET, Bit N and IMPROC# VALUES.
Figure 7:
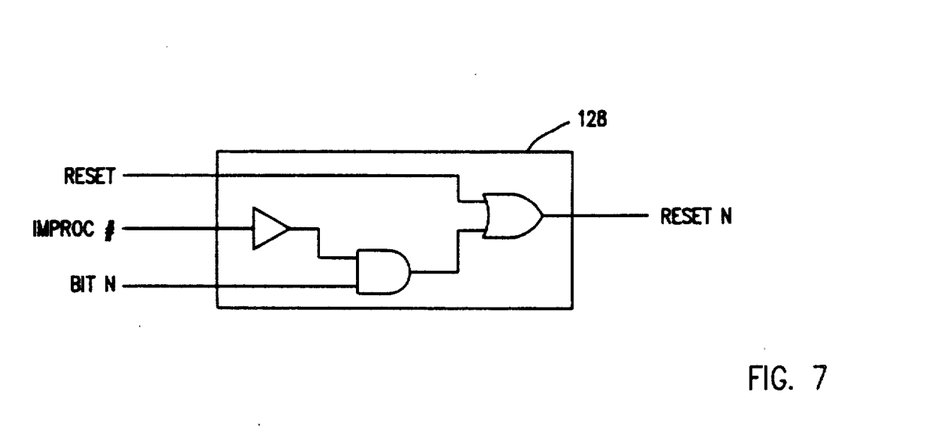
FIG. 7 is a schematic diagram of a portion of the present invention.

In a computer system according to the present invention, an IMPROC signal can be grounded on a processor 124, pulled up on a planar 126, and routed to reset control logic 128 as shown in FIG. 5 to indicate that a card is a processor card as opposed to, e.g., a memory or I/O card. With reference to FIG. 7, this IMPROC signal can be inverted and AND'd with the register bit before it is OR'd with the reset signal. A table depicting the results of such a signal interplay is set forth in FIG. 6. Thus, as should be appreciated by those skilled in the art, if a card other than a processor card were plugged in a slot, it would not ground the IMPROC signal and it would stay pulled high on the planar. Then, the reset to this card, as driven by the register bit, would be impeded and this card would come out of reset at the same time as the master processor.

Based on the foregoing, it should be appreciated that the present invention increases architecture flexibility by allowing ordered bring up of multiple processors. The present invention eliminates contention as processors come out of reset, and it allows master processors to initialize shared system RAM and I/O prior to allowing secondary processors to come out of reset. Furthermore, any processor that had previously been brought up and then found to have failed, can again be brought up using this circuit. Those aspects of the present invention that employ an IMPROC signal do not delay powering of nonprocessor components installed in slots that can accept either processor or nonprocessor cards.

It is thus believed that the operation and construction of the present invention will be apparent from the foregoing description. While the method and system described and shown have been characterized as being preferred, it will be obvious that various changes and modifications may be made therein without departing from the spirit and scope of the invention.

What is claimed is:

1. A computer system comprising:
   a first processor;
   a second processor;
   a bus connected to and shared by said first processor and said second processor; and a power on reset coordination means for said first processor and said second processor, said power on reset coordination means comprising means connected to said first and second processors for resetting said first processor and said second processor substantially simultaneously; and means connected to said first and second processors for deasserting reset to said first processor and to said second processor sequentially to prevent conflicting accesses to the bus by the first and second processors.

2. A computer system as set forth in claim 1, wherein deassertion of reset to a processor causes processor initialization, and wherein said means for deasserting reset to said first processor and to said second processor sequentially deasserts reset to said second processor after initialization of said first processor.

3. A computer system as set forth in claim 1, wherein said means for resetting said first processor and said second processor comprises a power on reset generator.

4. A computer system as set forth in claim 3, wherein said means for deasserting reset to said first processor and to said second processor sequentially comprises said power on reset generator, and means for delaying deassertion of reset to said second processor, connected to said power on reset generator and to said second processor.

5. A computer system as set forth in claim 4, wherein said means for delaying deassertion of reset to said second processor comprises a power on register and an OR gate connected in circuit between said power on reset generator and said second processor.

6. A computer system as set forth in claim 5, wherein said power on register comprises a plurality of bits, all of which bits are set high upon assertion of reset by said power on reset generator.

7. A computer system as set forth in claim 6, wherein the level of one of said plurality of bits provides one input to said OR gate and the assertion of deassertion of reset from said power on reset generator provides the other input to said OR gate, said OR gate providing its output to said second processor.

8. A computer system as set forth in claim 7, wherein said means for deasserting reset to said first processor and to said second processor sequentially further comprises means for clearing the one of said plurality of bits in said power on register upon initialization of said first processor, the clearing of which allows the initialization of said second processor.

9. A computer system as set forth in claim 8, further comprising n−2 additional processors with associated power on registers and OR gates as with said second processor, said n−2 additional processors sequentially brought out of reset upon clearing of a bit in said power on register by the last processor to come out of reset.

10. A method of powering up multiple processors in a computer system comprising the steps of:
    asserting reset of each of said multiple processors; essentially simultaneously and
    deasserting reset of said multiple processors sequentially.

11. A method as set forth in claim 10, wherein deassertion of reset of a processor causes processor initialization, and wherein said step of deasserting reset of said multiple processors sequentially proceeds to a successive processor after initialization of each processor in said system.

12. A method as set forth in claim 10, wherein said step of deasserting reset of said multiple processors involves the step of delaying deassertion of reset to successive processors.

* * * * *